United States Patent [19]
Burcombe et al.

[11] 4,334,386
[45] Jun. 15, 1982

[54] SOILESS GARDENING SYSTEM

[75] Inventors: Douglas A. Burcombe, P.O. Box 1432, Orange, Calif. 92668; Jean M. Wills, Orange, CA

[73] Assignee: Douglas Arthur Burcombe, Shingletown, Calif.

[21] Appl. No.: 160,075

[22] Filed: Jun. 16, 1980

[51] Int. Cl.³ ............................................. A01G 23/02
[52] U.S. Cl. ........................................................... 47/62
[58] Field of Search ................................. 47/59–64, 47/82, 66, 79

[56] References Cited

U.S. PATENT DOCUMENTS

| | | | |
|---|---|---|---|
| 2,062,755 | 12/1936 | Lyons et al. | 47/62 |
| 2,674,828 | 4/1954 | Tegner | 47/79 X |
| 2,884,740 | 5/1959 | Hollander | 47/79 X |
| 3,053,011 | 9/1962 | Silverman | 47/79 |
| 3,660,933 | 5/1972 | Wong | 47/62 |
| 4,183,176 | 1/1980 | Barfield | 47/79 |

Primary Examiner—Robert E. Bagwill
Attorney, Agent, or Firm—Ralph B. Pastoriza

[57] ABSTRACT

A modular soilless garden system can be started as a small garden and built gradually into a larger, automatic garden system irrigated by a pump. Two formed plastic tanks, a larger sump tank and a smaller grow tank, are provided with barbed nipples at their base for connecting the tanks with flexible plastic hose and barbed insert T-fittings to assemble them in any number of different sized systems. In one embodiment, the sump tank is designed to contain multiple grow tanks and a water supply for irrigating them. This is fed to the grow tanks by a pump located outside the sump tank. Using the hoses and T-fittings, multiple sump tanks and grow tanks can be connected and added on to the pump so a larger system can be gradually built. In a second embodiment, the smaller grow tank can be used individually with one hose and any one gallon container as a manual garden by watering from the top of the tank and draining through the bottom of the tank through the hose into that container. The grow tank has an insert nipple formed at its lowest point so it can be filled and drained from the bottom when being irrigated by the pump. It also has an overflow drain a certain distance from the top to drain off water at a desired level during the pumping cycle when the grow tank is being used in the sump tank irrigated by the pump. When the pump is used to irrigate the grow tanks, as it is in the first embodiment, water is pulled from the reservoir out of the sump tank by the pump and then pushed back through the sump tank in a second closed line connected to the grow tanks, to fill them from the bottom up to their overflow drain, at which point water spills from the grow tanks down to the sump tank below, thus recirculating the water through the grow tanks and the sump tanks until the pump is turned off. When the pump is no longer running, the water flow is reversed and drains by gravity back from the grow tanks to the pump and into the sump tanks to be stored until the next pumping cycle.

9 Claims, 4 Drawing Figures

SOILESS GARDENING SYSTEM

FIELD OF THE INVENTION

The present invention is a modular, multiple-sump, soilless gardening system incorporating multiple grow tanks and multiple sump tanks, which can be irrigated automatically as a system by a pump or manually, and has the ability to be expandable from a small garden to a large gardening system.

BACKGROUND OF THE INVENTION

Soilless garden systems that have been manufactured to date work automatically or they work manually. No manual garden's grow tank has ever been designed so that it can be fit into an automatic system's sump tank and likewise, no automatic system's grow tank has ever been designed to operate out of a sump tank. In soilless gardens large enough to produce a large crop of plants, the growing medium used to fill the large area of the grow tank weighs so much that the growing medium must be emptied out of the tank, and the crop harvested to move the grow tank, or to get underneath to the sump tank in order to clean it. Most automatic system's grow tanks have holes in the bottom for water drainage back to the sump tank so they can't be used out of the sump tank and irrigated because of leakage through their bottoms. These large systems also require a large financial investment to try them out. The smaller automatic gardens are generally too small to produce enough plants to offset their high cost and in order to expand your system you would have to purchase additional self-contained gardens.

BRIEF DESCRIPTION OF THE PRESENT INVENTION

With the foregoing in mind, the present invention provides a garden system that has the ability to be expandable by adding components and never making any parts obsolete in the process, as well as having the ability to be automatically or manually irrigated in a practical way.

In overcoming the prior art difficulties, our main object was to invent a garden that is inexpensive to manufacture on a mass production basis, that would require less parts than other systems, so as to reduce the cost of the garden further, and to simplify the consumer's effort in setting it up and using it.

Another object was to invent a garden with which a person could start with one grow tank and add more components on to it, one at a time, so as to be able to build their garden larger.

Another object was to figure out a way to run multiple small grow tanks and multiple sump tanks, off of one pump, using a simple flexible hose and plastic insert T-fitting plumbing system for connecting the tanks, so you can break down the normally large grow tank that large garden systems utilize.

Briefly in accord with the present invention, there is provided a portable sump tank of molded plastic material having an open top and a stable bottom for level seating on a flat surface. A hose connecting nipple extends into a lower side of this sump tank adjacent to its bottom. A portable grow tank of molded plastic material having an open top and a formed bottom for seating at a level higher than said sump tank is provided and includes an overflow opening in its upper half. A hose connecting nipple extends into a lower side portion of the grow tank adjacent to its bottom. Hose means are provided for connecting the hose connecting nipples of the sump tank and grow tank together, whereby the grow tank can be periodically irrigated with treated water in the sump tank to promote growth of plant life in the grow tank.

In the preferred embodiment, the sump tank is elongated so as to accommodate a plurality of identical grow tanks in side-by-side relationship, the hose means including hose segments and T-couplings connecting to the plurality of grow tanks so that a pump can be used to irrigate all of the grow tanks received in the sump tank, any one or more of the grow tanks being easily manually removable and replaced so that a modular growing system results.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
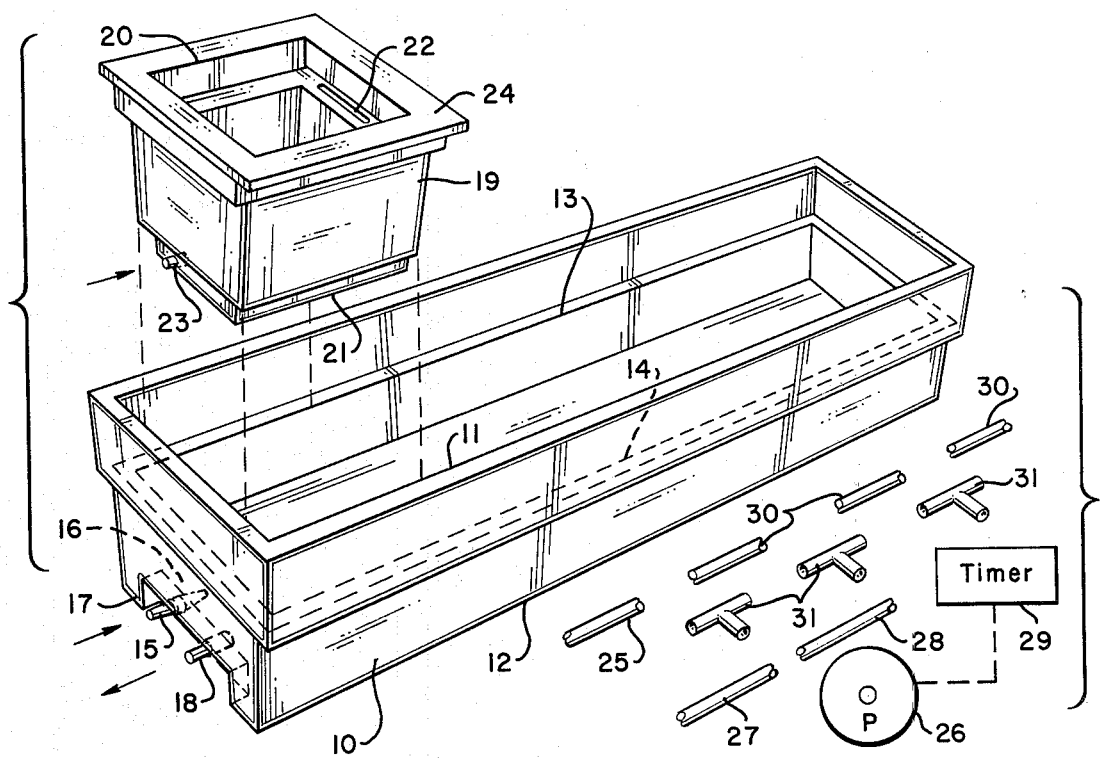
FIG. 1 is an exploded perspective view showing a sump tank, grow tank and other associated components in accord with the preferred embodiment of this invention.

Referring first to FIG. 1, the soilless gardening system includes a sump tank 10 of elongated rectangular shape having an open top 11 and a stable bottom 12 for level seating on a flat surface. Opposite longitudinal side walls of the tank each define an internal upwardly facing step such as indicated at 13 for the far longitudinal wall and 14 for the near longitudinal wall. The steps 13 and 14 are at approximately a mid position between the open top 11 and bottom 12 of the tank.

A hose connecting means in the form of a double nipple 15 passes through a recessed wall portion of the tank as shown in FIG. 1 such that one nipple 16 is interior of the tank and one nipple 17 is exterior of the tank. Those hose connecting nipples are "barbed" so that a hose can be easily manually inserted thereover and securely held in place.

The same wall of the tank 10 further includes a hose connecting drain nipple 18 which passes from the interior of the tank to the exterior at a point adjacent to the bottom 12.

Shown exploded above the sump tank 10 is a grow tank 19 having an open top 20 and a stepped bottom 21 for seating on the upwardly facing steps 13 and 14 in the sump tank 10. This grow tank includes at least one overflow opening such as indicated at 22 in its upper half portion. Further, the tank has a hose connecting feed nipple 23 extending into a side wall adjacent to its bottom 21. In the preferred embodiment, the grow tank 19 has a flat outwardly extending lip 24 about the margin of the top opening 20. This overhanging lip not only provides a convenient gripping portion so that the grow tank can be easily manually removed or inserted from the sump tank 10 but also serves to shade the open top 11 of the sump tank from direct sunlight when the grow tank is supported in the sump tank, all as will become clearer as the description proceeds.

Referring now to the lower right portion of FIG. 1, there are illustrated further components forming part of the system of the present invention. Thus, a hose segment 25 is provided for connecting the interior nipple 16 of the double nipple 15 for the sump tank 10 with the feed nipple 23 of the grow tank 19 after the grow tank has been positioned in the sump tank. Also shown is a pump 26 and cooperating hose segments 27 and 28 for connecting the pump between the exterior nipple 17 of the double nipple 15 and the drain nipple 18 such that operation of the pump will force nutrient solution from the sump tank up into the grow tank through the feed nipple 23 when the components are connected together. It will be appreciated that nutrient solution overflowing through the overflow opening 22 will return to the sump tank for further recirculation by the pump.

A timer indicated in the lower right portion of FIG. 1 at 29 may be provided for controlling the pump 26 to effect periodic transfer of nutrient solution in the sump tank 10 into the grow tank 19 to provide an automatic system. Further, while only one grow tank 19 is illustrated in FIG. 1, in the preferred embodiment, the sump tank 10 is elongated as shown having a length dimension such that a plurality of grow tanks can be received in the sump tank in side-by-side relationship and appropriately connected by additional hose segments and T-couplings also indicated in FIG. 1 as separate components at 30 and 31 respectively.

Figure 2:
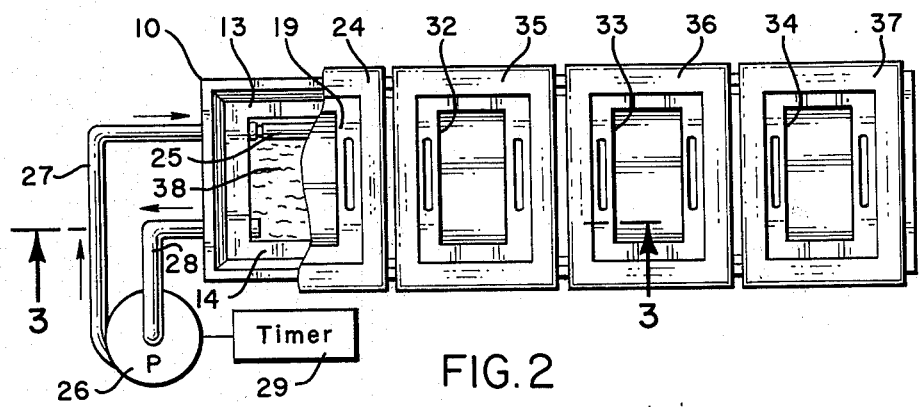
FIG. 2 is a top plan view, partly cut away of the various components of FIG. 1 in assembled relationship wherein a plurality of grow tanks are illustrated.
Figure 3:
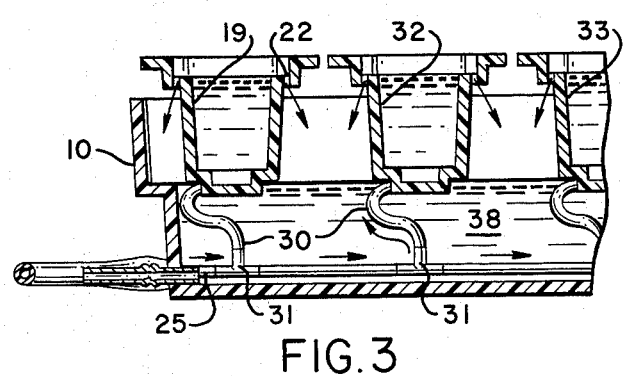
FIG. 3 is a fragmentary cross section taken in the direction of the arrows 3—3 of FIG. 2; and, FIG. 4 is a schematic illustration of additional sump tanks, showing how an expanded gardening system can be formed.

All of the foregoing will be better understood by now referring to the assembled views of FIGS. 2 and 3.

Referring first to FIG. 2, there are shown four grow tanks, the first constituting the grow tank 19 described in FIG. 1 and further identically designed grow tanks 32, 33 and 34. These latter grow tanks are provided with overhanging lips 35, 36 and 37 corresponding to the lip 24 on the first-mentioned grow tank 19. The plurality of grow tanks can all seat on the upwardly facing steps 13 and 14 of the sump tank 10 in such a manner that the overhanging lips will be adjacent and shield nutrient solution in the tank from the sun.

It will also be appreciated from FIG. 2 that where only one, two or three tanks are used, they can be placed adjacent to each other so as to eclipse the nutrient solution in the sump tank beneath these grow tanks, there being left an open access area to the sump tank at the end.

In FIG. 2, the hose segments 27 and 28 described briefly in FIG. 1 are shown connecting the pump 26 to the exterior nipple for the sump tank and drain nipple respectively.

In FIG. 3, the various additional hose segments 30 and T-couplings 31 are shown connecting the hose segment 25 to the various inlet feed nipples for the plurality of grow tanks 19, 32, 33 and so forth.

Because the grow tanks are all identical and the sump tank is designed to accommodate a plurality of grow tanks, it can readily be appreciated that a gardening system can be gradually expanded.

Figure 4:
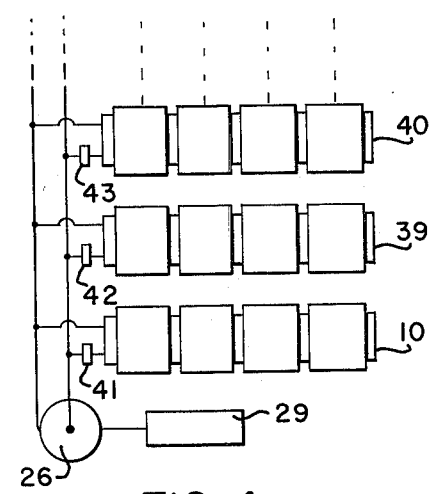

Moreover, in accord with the present invention, additional sump tanks identical to the sump tank 10 can be provided, each including a plurality of grow tanks and having their exterior and drain nipples connected in parallel with the hose segments connected to the pump 26. The foregoing is schematically illustrated in FIG. 4 wherein the additional sump tanks are indicated at 39 and 40. A single pump such as the pump 26 with timer 29 can be used simultaneously to irrigate grow tanks supported in these sump tanks. Pinch valves 41, 42 and 43 permit controlling the drain return to the pump from each tank to equalize water circulation.

In both FIGS. 1 and 3 it will be noted that the sump tank as well as the grow tank has inwardly sloping side walls. By providing such inwardly sloping side walls, the sump tanks and grow tanks can be nested together in stacked relationship all to the end that both can be easily shipped.

OPERATION

In operation, a properly prepared nutrient solution is introduced into the sump tank 10 such as indicated at 38 in FIG. 3. When the pump 26 is operated, it will withdraw this nutrient solution 38 through the drain nipple and connecting hose segment 28 shown in FIG. 2 and transfer it to the hose segment 27 back into the nutrient tank and by way of hose segment 25 and additional hose segments 30 and the T-connectors 31 into the feed nipples at the bottom portions of the grow tanks. The nutrient solution will thus fill these grow tanks from the bottom and when they reach the overflow openings such as the opening 22 for the grow tank 19, the nutrient solution will spill back into the sump tank 10.

The foregoing circulation will continue as long as the pump 26 remains energized. When the pump 26 is de-energized, then the nutrient solution in the various grow tanks will simply drain out their lower feed nipples and hose segments 30 back through the pump into the sump tank 10.

When the pump 26 is again energized at periodic time intervals under control of the timer 29, then the nutrient solution in the tank will again fill the grow tanks through the bottom feed nipples until the solution overflows back into the tank, the circulation again being continued until the pump is once again de-energized and back drain will result.

Where additional sump tanks are employed, the same single pump and timer can be used for all of the sump tanks as described in FIG. 4.

In its simplest form and in order to teach novices starting the garden system, it is only necessary to have two tanks. One tank serves as a sump tank and the other as a grow tank. For example, two of the modular grow tanks such as described at 19 in FIG. 1 could be used utilizing one as a sump tank. In this respect, a hose segment would interconnect the feed nipples 23 for each of the tanks. One tank could be filled with a nutrient solution and elevated to a position above the other tank so that nutrient solution would then feed down into the feed nipple and fill the lower level tank. This lower level tank could then be elevated to a position higher than the one tank to drain the solution back into the one tank. By designing the grow tanks with a stable bottom for level seating on a flat surface, it is a simple matter to adequately support the grow tanks at different levels.

As an alternative to the above, a single grow tank 19 could be used with a sump tank 10 elongated in structure as shown in FIG. 1 and a pump and timer used even though only one grow tank is in operation. Additional grow tanks could then be added as desired.

Having thus described the invention, it is to be understood that certain modifications in the construction and arrangements of the parts will be made, as deemed nec- essary, without departing from the scope of the appended claims.

We claim:

1. A modular soilless gardening system, including, in combination:
    (a) a portable sump tank of molded plastic material having an open top and a stable bottom for level seating on a flat surface;
    (b) a hose connecting nipple extending into a lower side portion of said sump tank adjacent to said bottom;
    (c) a portable grow tank of molded plastic material having an open top and a formed bottom, said sump tank including internal step means for supporting said grow tank above the bottom of the sump tank for seating the grow tank at a level higher than said sump tank, said grow tank including an overflow opening in its upper half;
    (d) a hose connecting nipple extending into a lower side portion of said grow tank adjacent to its bottom;
    (e) hose means for connecting the hose connecting nipples of the sump tank and grow tank together; and
    (f) a pump for pumping nutrient solution from said sump tank through said hose means into the lower side of said grow tank through said hose connecting nipple, said solution overflowing through said overflow opening in said grow tank to pass back into said sump tank whereby said grow tank can be periodically irrigated with treated water in said sump tank to promote growth of plant life in said grow tank.

2. A system according to claim 1, in which said sump tank is elongated so as to accommodate a plurality of identical tanks in side-by-side relationship, said hose means including hose segments and T-couplings connecting to said plurality of grow tanks so that said pump serves to irrigate all of the grow tanks received in said sump tank, any one or more of said grow tanks being easily manually removable and replaced so that a modular growing system results.

3. A system according to claim 2, inyluding a timer connected to operate said pump at given periodic intervals whereby an automatic system is provided.

4. A modular soilless gardening system including, in combination:
    (a) a portable sump tank of molded plastic material formed in an elongated rectangular shape having an open top and a stable bottom for level seating on a flat surface, opposite longitudinal side walls of the tank each defining an internal upwardly facing step at a mid position between the open top and bottom of the tank;
    (b) a hose connecting means in the form of a double nipple passing through a wall of said tank so that one nipple is interior of the tank and one nipple is exterior of the tank;
    (c) a hose connecting drain nipple passing from the interior of the tank to the exterior through a wall of the tank adjacent to the bottom;
    (d) at least one portable grow tank of molded plastic material having an open top and a stepped bottom for seating on the upwardly facing steps in said sump tank, said grow tank having at least one overflow opening in its upper half;
    (e) a hose connecting feed nipple extending into a side wall of said grow tank adjacent to its bottom;
    (f) a hose segment connecting the interior nipple of said double nipple to said feed nipple;
    (g) an external fluid pump; and
    (h) hose segments connecting said pump between said exterior nipple of said double nipple and said drain nipple such that operation of the pump will force nutrient solution from said sump tank up into said grow tank through said feed nipple, nutrient solution overflowing through the overflow opening returning to said pump tank for further recirculation by said pump.

5. A system according to claim 4, including a timer connected to said pump for periodically operating the same whereby an automatic system is provided.

6. A system according to claim 5 in which the length of said sump tank is such that a plurality of said grow tanks can be received and supported in a single sump tank on said steps in side-by-side relationship; and additional hose segments and T-couplings connecting the feed nipples in the plurality of grow tanks to said interior nipple so that said external fluid pump will circulate nutrient solution through all of the grow tanks simultaneously when operated, one or more of the grow tanks being easily manually removable and insertable so that a modular and expandable system results.

7. A system according to claim 6, including additional sump tanks identical to said first mentioned sump tank, each supporting a plurality of grow tanks and having their exterior and drain nipples connected in parallel with said hose segments connected to said pump to thereby provide a greatly expanded modular soilless gardening system.

8. A system according to claim 7, in which the grow tanks have inwardly sloping side walls so that they can be nested together in stacked relationship and wherein the sump tanks have inwardly sloping side walls so that they can be nested together in stacked relationship all to the end that both the grow tanks and sump tanks can be easily shipped.

9. A system according to qlaim 6 in which each of the plurality of grow tanks has an upper lip about its top opening providing a convenient gripping means for manual manipulation of the tank and also dimensioned to overhang the opposite longitudinal sides of the sump tank to thereby shade nutrient solution in the sump tank.

* * * * *